United States Patent [19]

Worsham et al.

[11] 4,218,676
[45] Aug. 19, 1980

[54] METHOD FOR CHASING GAME EMPLOYING A SET OF TIMED SOUND GENERATORS

[76] Inventors: Daniel A. Worsham, 1300 Pine St., San Jose, Calif. 95125; John D. Schmidt, 868 Robb Rd., Palo Alto, Calif. 94306

[21] Appl. No.: 799,468

[22] Filed: May 23, 1977

[51] Int. Cl.² ............................................. G08B 3/00
[52] U.S. Cl. ............................... 340/384 E; 340/309.4
[58] Field of Search ............... 340/15, 384 E, 309.4; 58/152 B; 43/124

[56] References Cited

U.S. PATENT DOCUMENTS

| | | | |
|---|---|---|---|
| 3,872,472 | 3/1975 | Moschgat | 340/15 |
| 3,873,960 | 3/1975 | Gates | 340/15 |
| 3,969,720 | 7/1976 | Nishino | 340/309.4 |
| 3,980,868 | 9/1976 | Thompson | 340/309.4 |
| 4,104,861 | 8/1978 | Yoda | 58/152 B |

*Primary Examiner*—Howard I. Pitts
*Attorney, Agent, or Firm*—Harry E. Aine; Harvey G. Lowhurst

[57] ABSTRACT

In a method for chasing game, a set of portable sound generators are set out in the field in accordance with a predetermined pattern for chasing the game in a predetermined direction when the sound generators are actuated. Each of the sound generators has a clock associated therewith and means for setting the turn-on time to an accuracy of plus or minus at least a few seconds, such that precise timing of the turn-on time of respective ones of the sound generators is settable, as desired. The turn-on times are then set in accordance with the positions of the respective sound generators in the predetermined pattern so that the sound generators turn on in a predetermined sequence for chasing the game in the predetermined direction.

1 Claim, 2 Drawing Figures

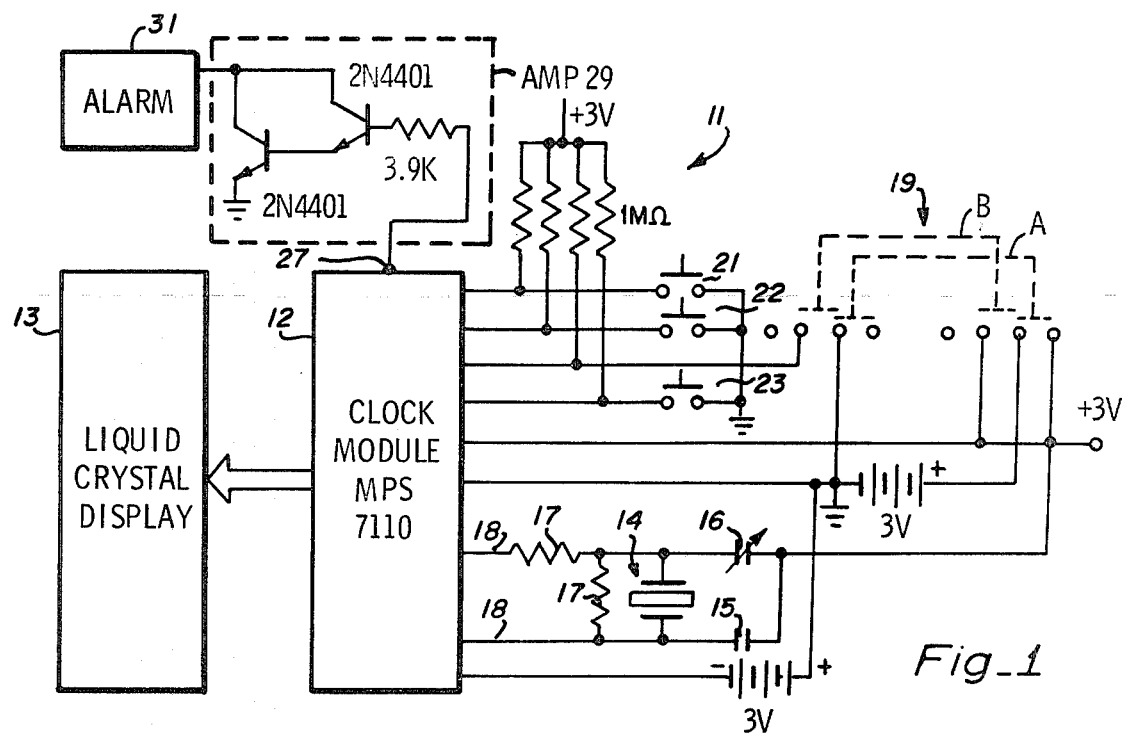
Fig_1
Fig_2

METHOD FOR CHASING GAME EMPLOYING A SET OF TIMED SOUND GENERATORS

BACKGROUND OF THE INVENTION

The present invention relates in general to chasing game and more particularly to an improved method for chasing game employing a set of timed sound generators.

DESCRIPTION OF THE PRIOR ART

Heretofore, noise makers have been employed for chasing game. Usually the noise maker is carried by a beater and a line of beaters advances through the brush or field in such a way as to drive the game in a predetermined direction ahead of the advancing line of beaters. The problem with this arrangement is that it is extremely costly in manpower and not feasible in many parts of the world.

It is also known to scare off game by use of automatic sound generators. Examples of the latter are found in U.S. Pat. Nos. 3,873,960 issued Mar. 25, 1975 and 3,872,472 issued Mar. 18, 1975.

Therefore, it is desired to provide an improved method for chasing game wherein the number of people employed for chasing game is greatly reduced, or completely eliminated.

SUMMARY OF THE PRESENT INVENTION

The principal object of the present invention is the provision of an improved method for chasing game and more particularly to such a method employing a set of timed sound generators.

In one feature of the present invention, a set of sound generators are deployed in a predetermined pattern relative to a region in which it is expected that the game will be at the start of the chase. The sound generators are set for predetermined turn-on times which were settable to within at least a few seconds such that precise timing of the sound generators is obtained. The turn-on times of the generators in the pattern are then set in accordance with a predetermined sequence for chasing the game in a predetermined direction.

Other features and advantages of the present invention will become apparent upon a perusal of the following specification taken in connection with the accompanying drawings wherein:

BRIEF DESCRIPTION OF THE DRAWINGS

FIG. 1 is a schematic circuit diagram, partly in block diagram form, of a timed sound generator useful for carrying out the method of the present invention, and FIG. 2 is a plan view depicting a pattern of sound generators together with the turn-on sequence for driving the game in a predetermined direction.

DESCRIPTION OF THE PREFERRED EMBODIMENTS

Referring now to FIG. 1 there is shown a timed sound generator 11 useful in practicing the method of the present invention. The sound generator 11 includes an integrated circuit clock module, such as an MPS Model 7110, commercially available from Micro Power Systems, Inc. The clock module 12 is interconnected with a liquid crystal display, such as an AMI Model 523570 display, having a number of seven segment indicators for indicating the time output signals generated by the clock module 12. In a preferred embodiment, a 24-hour display module 13 is employed for displaying the hour, the minute and the second. The liquid crystal display module 13 is connected to the clock module 12 via an array of connectors.

Precise timing for the clock module is obtained from a crystal oscillator 14 which includes a piezoelectric crystal cut for a resonance of 32.768 kilohertz. Tuning capacitors 15 and 16 are coupled in circuit with the crystal 14 for fine tuning the resonance of the crystal 14. The output signal derived from the crystal 14 is fed via voltage divider network 17 and leads 18 into the clock module 12.

A sliding switch 19 is provided for selecting either the alarm set or time set functions. More particularly, when switch 19 is in position A, three additional switches 21, 22, and 23 are employed for advancing the minutes and hours of the clock module 12. The third switch 21 indicated as "FAST" when depressed with the minute set 22 or hour set switch 23 serves to cause the minutes or hours to advance at a more rapid rate. When the "FAST" switch 21 is depressed and neither the minute or hour advance switches are depressed, the time of the clock module is stopped. This may be utilized to advantage for synchronizing the time of the clock module with a wristwatch second hand so that the clock module may be synchronized to a given second. When the sliding switch 19 is switched to position B, the set switches 21, 22, and 23 may be employed for setting the alarm turn-on time.

The alarm output is derived from the clock module 12 at 27, amplified in amplifier 28, and utilized to actuate the alarm 29 which may comprise merely a noise maker such as a bell, buzzer, horn or the like, or to turn on a radio, or a tape recorder for playing back an endless loop recording of animal noises, or the like.

Referring now to FIG. 2, it is shown how the sound generators 11 are employed for driving game indicated at 32 in a desired direction, such as toward three hunters at 33. On a previous day, a set of the sound generators 11 has been set out in a predetermined pattern as indicated in FIG. 2 relative to the expected location of the game at 32 and the predetermined positions of the hunters or photographers at 33. Timing of the sound generators 11 in the pattern is set so that the first sound generator 11 is turned on at time t equal $t_o$. A second pair of the timing generators 11 of the pattern is set to sound at $t_o + 10$ seconds, a second pair is set to sound at $t_o + 30$ seconds. A third pair is set to sound at $t_o + 50$ seconds and a fourth pair is set to sound at $t_o + 70$ seconds. The precise timing of the turn-on times of the sound generators 11 will depend upon the type of game to be driven, the type of terrain, and the respective pattern established on the ground.

What is claimed is:
1. In a method for chasing game, the steps of:
setting out in the field a set of portable self-contained sound generators in a pattern relative to a region where it is expected the game will be at the start of the chase for chasing the game in a predetermined direction when said sound generators are turned on, each of said sound generators having a clock associated therewith and means for setting the turn-on time of said respective sound generator to a time within at least a few seconds of the desired turn-on time such that precise timing of the turn-on time of respective ones of said set of said sound generators is settable as desired; and
setting the turn-on times of respective ones of said sound generators in said pattern for causing said sound generators to turn on in accordance with a predetermined sequence for chasing the game in a predetermined direction.
* * * * *